July 15, 1958
J. E. JACOBS
2,843,748
INSPECTION DEVICE
Filed Aug. 20, 1951
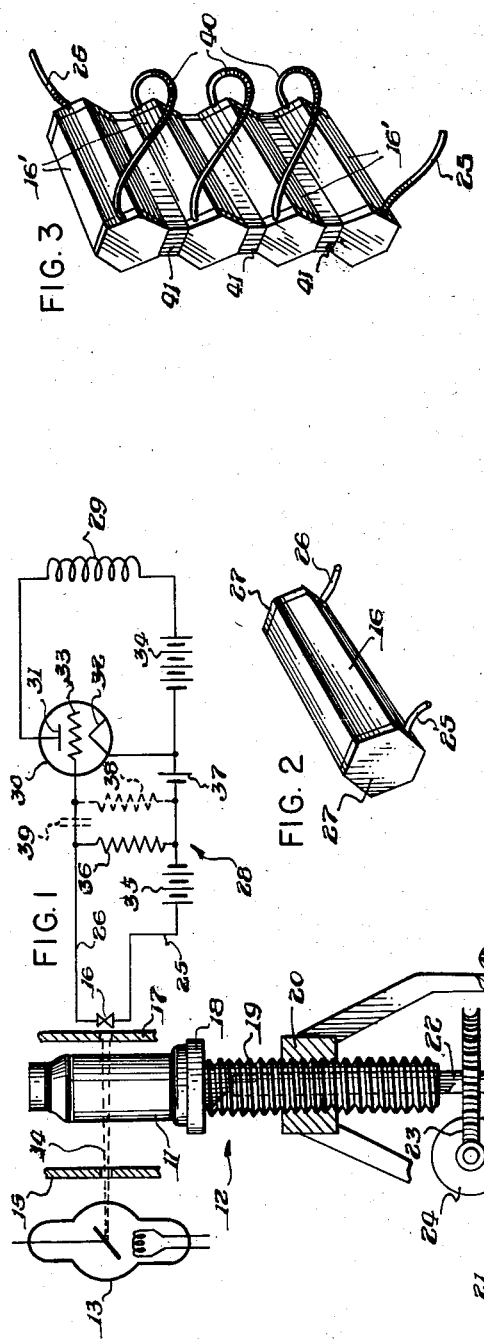
INVENTOR:—
JOHN E. JACOBS
BY:—
ATT'YS

2,843,748
Patented July 15, 1958

United States Patent Office

2,843,748
INSPECTION DEVICE

John E. Jacobs, Milwaukee, Wis., assignor to General Electric Company, a corporation of New York Application August 20, 1951, Serial No. 242,697

10 Claims. (Cl. 250—51)

The present invention relates in general to inspection apparatus, and has more particular reference to equipment for detecting variations in the density of objects or material under examination.

Devices embodying the present invention are particularly well adapted to detect slight density variations such as are caused by voids within the examined article, or by the presence of objects embedded or enveloped in the body of material being examined, where such objects are of greater or lesser density than the material of the body under examination. In this connection, the enveloped bodies of greater or lesser density may be of the same material as that of the body being inspected, or may comprise different material.

Apparatus embodying the present invention, for example, may be employed to detect defects such as cavities, occluded fragments of foreign material, and other internal flaws in superficially flawless metal parts; to detect voids, cavities, or contaminant materials in explosive charges in situ, as in a loaded projectile; to detect voids or contaminant substances in packaged material, including food products; and for numerous other inspectional processes involving detectable variation from normal or uniform density of the material to be inspected.

An important object of the present invention is to provide new and improved means for detecting variations in density of material, whereby inspection may be accomplished merely by disposing the mass of material, in a suitable container if necessary, in proper position in the inspection apparatus.

Another important object is to provide inspection equipment, including means for passing X-rays through the material to be inspected, and detecting voids or opacities in the material in terms of the intensity of X-rays transmitted therethrough; a further object being to provide sensitive equipment for relative density inspection by the progressive X-ray scanning of an object to be inspected, as by moving the object in the path of an X-ray beam while detecting the relative intensity of X-rays transmitted through said object.

Another important object is to provide relative density inspection equipment comprising a suitable source of X-rays, and sensitive X-ray detecting means spaced from the source and arranged to discriminate between relatively small changes in the intensity of the X-rays reaching such detection means, including means for relatively shifting the article or object being inspected in the path of the X-ray beam, whereby to progressively scan the object under inspection.

Another important object is to employ a suitable semiconductor material, such as cadmium or mercury sulphide, or cadmium selenide, as an X-ray sensitive detector for determining slight changes in the intensity of X-rays impinging on the detector; a further object being to provide translation means for indicating X-ray intensity changes in terms of variation in the electrical impedance of the sensitive maerial; a still further object being to utilize the X-ray responsive current carrying characteristics of the sensitive material for the determination of density differentials in the material being inspected.

Another important object is to provide suitable electrical translation circuit means for measuring the current carrying condition of an X-ray sensitive semi-conductor, to thereby measure or indicate variations in the density of an article being inspected as the same is progressively scanned by an X-ray beam.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a diagrammatic view of inspection apparatus embodying the present invention;

Fig. 2 is a perspective view of a sensitive element forming a part of the apparatus shown in Fig. 1;

Fig. 3 is a perspective view showing an array of sensitive elements electrically interconnected in series and adapted for employment for density inspection purposes in accordance with the present invention; and Fig. 4 is a diagrammatic view showing inspection apparatus embodying the present invention.

To illustrate the invention the drawings show an article or object 11 to be inspected for density variations. While the invention is not necessarily restricted to any particular kind of inspection subject, the article 11 as shown may comprise a container and its contents. Specifically, the drawings show a shell or case adapted to contain an explosive charge and to form a part of gun ammunition. In the manufacture of ammunition, especially that designed for artillery purposes, it is desirable to be able to detect imperfections not only in the shell or container, but also in the explosive material with which the shell is loaded; and the present invention provides exceedingly efficient means for examining artillery ammunition for the purpose of detecting defects at the factory. The invention, of course, is not necessarily limited to the examination of artillery shells but its principles may be applied in detecting density variations in any X-ray translucent material including metal articles, packaged food products, and numerous other manufactured items. In this connection, the examined material, including the material of which the container is made, may be opaque, translucent, or transparent to visible light rays, the same, in the illustrated embodiment, comprising a shell of steel or other suitable metal, the shell containing an explosive substance.

As shown more particularly in Fig. 1, the article 11 may be mounted on any suitable support means 12 adapted to carry the article in position to be inspected. The inspection equipment may comprise a suitable source of X-rays such as may be provided by a conventional X-ray tube 13, having a cathode and a cooperating anode adapted to constitute an X-ray source when energized by the impingement of electrons emitted by the cathode. The X-ray source 13 may be mounted on suitable support means in position to direct a beam of X-rays 14 through a collimator, which may comprise an opening in a screen 15 of X-ray impervious material such as lead, said opening being disposed in position to transmit the beam 14 as a pencil of X-rays directed transversely through the article 11, toward an X-ray sensitive detector element 16 suitably mounted and supported on the side of the article 11 remote from the X-ray source. If desired, additional collimator means, preferably comprising a plate 17 having an opening in registration with the sensitive element 16, may be interposed between the sensitive element and the article 11 to be inspected.

The sensitive element 16 thus may be irradiated by the pencil-like X-ray beam 14 only after the same has passed through the article to be inspected; and the intensity of X-rays thus applied upon the element 16 will depend upon the X-ray absorptive character of the material through which the beam 14 shall have passed in reaching the element 16. If the beam be transmitted through a portion of the element containing a void or cavity the intensity of rays reaching the element 16 will be relatively higher than would be the case were the beam to traverse voidless portions of the article 11. Conversely, the intensity of rays impinging on the element 16 after passing through portions of the article 11 containing impurities will be relatively lower than would be the case were the beam to traverse portions of the article 11 containing no impurities, providing that such impurities be of lesser X-ray transparency than the material of the article 11 or its contents. Where impurities are of greater X-ray transparency than the material of the examined article, the X-ray impinging on the sensitive element 16 will be relatively more intense than where the beam traverses portions of the article that are free from impurities or voids.

It should be understood, of course, that the inspection or gauging equipment, including particularly the ray source 13, the element 16, and the collimator means 15 and 17, may be mounted in fixed relation with respect to the support means 12. For some gauging purposes, however, it may be expedient or desirable to provide for the adjustable movement of the support vertically with respect to the stationarily mounted inspection equipment, or for movement of the inspection equipment vertically with respect to the support. As shown in Fig. 1, the support means 12 is arranged not only to move the article 11 between the X-ray source and the sensitive detector element, in a direction transversely of the beam, but also to turn or rotate the article 11 during transverse movement thereof, in order that any desired zonal portion of the article 11 may be completely scanned by the beam 14. To this end the support means 12 may comprise a platform plate 18, mounted on a screw threaded shaft 19 having screw threaded engagement in a stationary nut 20 carried by a mounting frame 21, means being provided for turning the threaded shaft to move it vertically on the frame 21, to thereby shift the supported article 11 between the X-ray source and the sensitive element 16. The platform plate 18, being fast on the shaft, may turn therewith thereby rotating the article 11 as the same is moved. The shaft 19 may have splined engagement with a driving shaft 22, suitably journalled in the frame 21 and drivingly connected, as by means of suitable gearing 23, with a driving motor 24. Of course, any suitable mechanism may be provided for moving the article to be inspected between the ray source 13 and the element 16 in any desired fashion for scanning purposes, the means illustrated being merely for the purpose of exemplifying one way of moving the article 11 during the inspection thereof. The combined axial and rotary motion afforded by the mechanism shown is however particularly well suited for the inspection of artillery shells.

The X-ray sensitive element 16 preferably comprises a crystal or crystals of a suitable X-ray sensitive semiconductor material such as cadmium or mercuric sulphide, or cadmium selenide. For the purpose of explaining the present invention, a semi-conductor may be defined as a substance having electrical resistance or reactance, or both, which vary in accordance with the intensity of rays to which the substance is exposed, the combined electrical resistance and reactance of a conductor being commonly referred to as the impedance thereof. Cadmium and mercury sulphides, and cadmium selenide, in this respect, have been found to be semi-conductors usefully sensitive to X-rays, the same in the absence of X-rays having impedance characteristics of such high order as to constitute them as virtual insulators capable of substantially preventing the flow of electrical energy therethrough. The electrical characteristics of the named materials are such that the impedance thereof progressively declines or becomes reduced in proportion to the intensity of X-rays impinging thereon and, as more fully explained in copending applications Serial No. 190,801, filed October 18, 1950, now Patent No. 2,706,790, and Serial No. 232,073, filed June 18, 1951, now Patent No. 2,706,791, the intensity of impinging X-rays may be accurately measured in terms of the apparent impedance of the sensitive semi-conductor element 16.

These named semi-conductors may also be distinguished from commonly known semi-conductors in that they exhibit current amplifying characteristics when irradiated with X-rays. Semi-conductors operate as such through the release of electrons, entrapped therein, when subjected to energy rays to which sensitive. Commonly known semi-conductors, such as selenium, none of which are to any appreciable or useful extent sensitive to X-rays, operate to release electrons in direct proportion to changes in the electrical space charge of the material, as the result of ray impingement thereon, and thus do not show current amplifying characteristics. The sulphides of cadmium and mercury, however, as well as the selenide of cadmium release many thousands or hundreds of thousands of electrons in response to unit alteration of the space charge therein, when excited by rays, including X-rays, to which said materials are sensitive. The sensitive element 16 thus, in effect, comprises a tiny amplifier capable of delivering a substantial quantity of electrical current when excited by X-rays. It is thought that the amplifying character of the crystals is due to the fact that cadmium and mercury sulphide and cadmium selenide comprise what may be called excess electron or electron donor semi-conductors, the excess energy necessary to produce amplified currents in the crystal being derived from the electron producing character of the material itself, when irradiated or triggered by exposure to X-rays. It is suggested that electron donor centers in each crystal become ionized by the impinging X-rays, thus forming stationary positive space charges in the material. The amplifying character of these electron donor materials can be compared to that of a conventional triode tube where the grid is assumed to be floating. In such a tube the grid takes up a negative charge as the result of electron flow therein, thus reducing the plate current to a small value. If the grid, however, is charged positively the current will materially increase. In electron donor type of crystal material, the conduction electrons are, to a large extent, localized in traps, thus forming a current-reducing, stationary, negative space charge. Upon ray impingement on the crystal, its electron donor centers become ionized, thus assuming positive charges. These stationary positive charges are thought to act in the same way as do positive charges on the grid of a triode tube. One positive hole, or center, so established in the crystal, appears to control the flow of more than ten thousand electrons in the crystal. This is in contradistinction to the action of ordinary photo-sensitive conductors, such as selenium, where this amplification mechanism is absent. As a consequence, electrical energy is released in the electron donor type of crystal material in the form of crystal current that is many times the energy applied to the crystal by the exciting ray, the action being such as to render these electron donor semi-conductors detectably sensitive to X-rays.

X-ray sensitive crystals of cadmium and mercury sulphide and of cadmium selenide may be grown in the form of hexagonal prisms, by vapor phase procedures, such a crystal, greatly enlarged, being illustrated in Fig. 2 of the drawings. Such a crystal may be electrically connected at its opposite ends with suitable conductors 25, 26 as by coating the opposite ends of the crystal each with a layer or plate of electrical conducting material 27, with which the conductors 25 and 26 may be electrically joined; and the present invention utilizes the semi-conducting and amplifying characteristics of the element 16 for density gauging purposes by providing for measuring the apparent impedance of the sensitive element as and while the article 11 is in position between the X-ray source and the sensitive element 16. Any substantial variation of the so measured impedance of the element 16 will indicate an imperfection in the article being inspected; and by moving the article during the inspectional process, in the manner heretofore described, in order to scan the article with the beam, the exact size, location and general nature of the imperfection may be accurately determined, in the scanned portions of the examination object. Voids or cavities in the inspected article, or the presence of impurities of greater X-ray transparency than the material of the examined article, will be shown by decrease in the measured impedance of the element, that is to say by increase in current flow therethrough. The presence of foreign material in the article 11, if such material be relatively less transparent to X-rays than the material of the article 11 or its contents, will be revealed by an increase in the measured impedance value of the element 16, that is to say by decrease in current flow therethrough.

Any suitable or preferred means may be employed for determining the impedance of the element 16. As shown, such means may comprise an electronic translation system 28 adapted to actuate a suitable load device 29 which may serve to operate any desired type of indicating or recording equipment, or other mechanism which it may be desired to operate, in accordance with the density variations detected in the element 11. The translation system 28 preferably comprises an electron flow amplifier 30 having an anode 31, an electron emitting cathode 32 and a flow regulating grid 33, the plate 31 and the cathode 32 being interconnected in an output circuit including a suitable power source 34 and the load device 29 to be operated. The control grid 33 may be interconnected with a grid control circuit in which the sensitive crystal element 16 is also operatively connected, whereby to electrically energize the grid 33 for the control of the output circuit of the tube in accordance with the transitory impedance value of the crystal 16. To this end, the grid control circuit may comprise the sensitive crystal 16, a preferably uni-directional power source 35 and a ballast or control resistor 36, interconnected in series, so that electrical potential corresponding with the impedance value of the crystal may be developed at the resistor 36, as at the opposite ends thereof, for application between the cathode 32 and the control grid 33. In order to thus control the grid 33, the cathode 32 may be connected with one end of the resistor 36 through a suitable source of grid biasing power 37. The other end of the resistor may be connected directly with the grid 33.

The foregoing arrangement is adapted to operate the tube 30 in accordance with the uni-directional and fluctuating components of current passing through the crystal 16 under the influence of the power source 35 when the crystal is exposed to X-rays from the source 15. In this connection it should be understood that current flowing in the crystal 16, under the conditions mentioned, will include a fluctuating component in addition to a uni-directional component, if the source of X-rays 13 produces rays of fluctuating character as is the case where the source comprises a conventional tube energized by alternating current electrical power at an alternating frequency of 60 cycles. Where the source 13 is of a sort producing X-rays of uniform intensity, there will of course be no fluctuating component of crystal current in the translation system 28.

It may be desirable, in some cases, to operate the translation system 28 only in response to the fluctuating component of crystal current. In such case, a resistor 38 and a condenser 39 may be applied as shown in dotted lines in Fig. 2 in order to prevent the application of uni-directional potential components developed in the crystal controlled circuit from reaching the grid 32, so that the same may be controlled solely in accordance with the fluctuating component of crystal current. Alternately, it may be desirable to operate the gauging system 28 only in response to the uni-directional current component developed in the crystal controlled circuit. In such case, suitable filtering means may be incorporated in the system in order to exclude the fluctuating energy component from the element 33 and to allow application, on said element, of potential corresponding to the uni-directional component of crystal current only. Where the differential to be measured is small, it is usually preferable to employ the fluctuating component only for grid control purposes. The uni-directional current component or the combined fluctuating and uni-directional components may be successfully used where wider differentials are involved, that is to say, where extreme discriminating sensitivity is not required.

For high speed scanning, requiring substantially instantaneous crystal response, it may be necessary to employ the A. C. component of crystal current only, and in addition to apply a light bias directly on the crystal to obtain optimum sensitivity and response speed, as described in said co-pending applications aforesaid.

As shown more particularly in Fig. 3, a plurality of sensitive crystal elements 16' may be electrically interconnected in series, as by means of suitable conductors 40, of any preferred or convenient character; and said series connected elements 16' may be substituted for the single element 16 in the translation system 28 shown in Fig. 1. The elements 16' may be supported in side by side relationship and, if desired, spaced apart by spacing elements 41, which preferably may comprise strips of insulating material. The elements 16' may be mounted in any desired or preferred relative position to receive impingement of rays directed through the examined object from the source 13. The employment of a series of elements 16' in such fashion allows the scanning of a relatively wide zone of the examined object, thereby speeding up the examination thereof. Since the elements 16' are interconnected in series relationship, it will be seen that any change in the impedance of any one of the series connected elements will correspondingly alter the control potential applied upon the grid of the translation element 30 and thereby accomplish the desired density variation detection.

As shown more particularly in Fig. 4 of the drawings, a plurality of sensitive crystal elements 16a, 16b, 16c, 16d may be electrically interconnected in parallel relationship for the detection of density variations. The so connected elements may each be connected with a corresponding translation system 28a, 28b, 28c, 28d for operating corresponding load devices 29a, 29b, 29c, and 29d, each in accordance with impedance variation in its corresponding ray sensitive element. The several translation systems may comprise amplifying tubes 30a, 30b, 30c, 30d, each having an anode or plate, an electron emitting cathode and an electron flow regulating grid. The plates and cathodes of the tubes may be interconnected in output circuits including the load devices and a suitable power source 34' common to all of the output circuits. The control grids of the amplifying tubes may each be connected in a corresponding grid control circuit, in which the corresponding sensitive crystal element is also electrically connected, in order that the grids of the several amplifying tubes may be electrically energized, each for the control of its corresponding output circuit, in accordance with the transitory impedance value of its corresponding crystal element. As shown, the grid control circuits may comprise the sensitive crystals 16a, 16b, 16c, 16d, and corresponding ballast or control resistors 36a, 36b, 36c, 36d arranged in parallel relationship and commonly connected with a suitable uni-directional power source 35'. This arrangement may be effected by connecting like ends of the several crystals with one side of the power source 35', like ends of the several ballast resistors being commonly connected with the other side of said source, and the source remote end of each crystal being electrically connected only with the source remote end of its corresponding resistor. The commonly connected cathodes of the amplifier tubes may be connected through a source of uni-directional grid biasing power 37' with the commonly connected ends of the ballast resistors, and source remote portions of said resistors may each be connected with the control grid of the corresponding amplifier tube. As shown in dotted lines in Fig. 4, condensers and bias resistors similar to the resistor 38 and the condenser 39 in Fig. 1 may be incorporated in each of the several translation circuits to exclude uni-directional energy components from the crystal controlled circuits upon the control grids of the amplifier tubes. Alternately, suitable filter means may be incorporated in each circuit to exclude fluctuating components from the control grids of the tubes. If desired, gas conduction lamps 41 may be interconnected between the plates of the several amplifier tubes, in order to give visual indication of the action of the apparatus.

It is, of course, within the contemplation of the present invention that the tubes 30, in Fig. 1, and the tubes 30a, 30b, 30c and 30d of Fig. 4, be employed to drive intermediate amplifier tubes, including gas filled thyratron tubes, where desirable or necessary for the operation of the load device 29, or the devices 29a, 29b, 29c and 29d. Such intermediate amplifier tubes driven by the output of the tube 30, or tubes 30a, 30b, 30c and 30d, may comprise inverse feed back cascade amplifying systems for the operation of the connected load devices.

The parallel connection array illustrated in Fig. 4 is adapted to afford a critical location density variation inspection of an examined object, since the exact position of a detected density variation spot, in the examined object, may be directly located opposite the sensitive element showing the variation. The series array illustrated in Fig. 3 will indicate a density variation only within the zone scanned by all of the series connected elements.

X-ray sensitive crystal materials of the sort herein contemplated are responsively sensitive to X-ray irradiation of the end portions of the crystal which are held electrically negative, as compared with the other end of the crystal. Of course, the crystal material is relatively transparent to X-rays so that the irradiating rays will penetrate to the electrically negative end of the crystal even if the crystal be mounted with its electrically positive end facing toward the ray source. It is desirable, however, to mount the detecting crystals so that the ends thereof which are electrically negative, as determined by the polarity of the power source 35, or 35', face toward the ray source 13.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Density gauging apparatus comprising an X-ray source, an X-ray sensitive semi-conductor element disposed in position to receive a beam of rays from said source through an examination object, means to measure the impedance of said semi-conductor element, and a movable examination object carrier forming means operable to relatively rotate the examination object in said beam between said source and element whereby to progressively scan the object with said rays.

2. Density gauging apparatus comprising an X-ray source, an X-ray sensitive semi-conductor element disposed in position to receive a beam of rays from said source through an examination object, a movable examination object carrier forming means operable to measure the impedance of said semi-conductor element, and means to relatively rotate and axially move the examination object in said beam between said source and element whereby to progressively scan the object with said rays.

3. Density gauging apparatus as set forth in claim 1, wherein the X-ray sensitive semi-conductor element comprises crystalline cadmium sulphide.

4. Density gauging apparatus as set forth in claim 1, wherein the X-ray sensitive semi-conductor element comprises crystalline mercury sulphide.

5. Density gauging apparatus as set forth in claim 1, wherein the X-ray sensitive semi-conductor element comprises crystalline cadmium selenide.

6. The method of determining the relative density of the constituent material of an examination object which comprises transmitting an X-ray beam through the object, applying such transmitted beam upon an X-ray sensitive semi-conductor element, while relatively turning and axially shifting the examination object in said beam whereby to progressively scan adjacent portions of the object along a helical scanning path, and measuring the intensity of the transmitted beam in terms of the impedance of the semi-conductor element.

7. The method of determining the relative density of the constituent material of an examination object, which comprises transmitting a pencil-like beam of X-rays through the object and upon an X-ray sensitive semi-conductor element, while continuously rotating the object in the beam to thereby progressively scan the object with the beam, and measuring the impedance of said conductor element.

8. The method of determining the relative density of the constituent material of an examination object which comprises applying an X-ray beam upon an X-ray sensitive detector element, relatively turning the object about an axis of rotation in and extending transversely of said beam, while simultaneously moving the object in the beam in the direction of said axis to thereby progressively scan adjacent portions of the object with said beam along a helical scanning path, and measuring the response of said detector to rays impinging thereon after traversing the examination object.

9. Density gauging apparatus comprising an X-ray source, an X-ray sensitive detector element disposed in position to receive a beam of rays emitted from said source, a movable examination object carrier forming means operable to turn an examination object continuously about an axis of rotation in and extending transversely of said beam and to axially move the said object in the direction of said axis whereby to progressively scan the object with said beam along a helical scanning path, and means for measuring the response of said detector element to variations in the intensity of impinging X-rays.

10. Density gauging apparatus comprising an X-ray source and associated collimator means adapted to define a pencil-like scanning beam emanating from said source, an X-ray sensitive detector element disposed in the path of said beam, a support for mounting an examination object between said source and said detector element in position to be scanned by said beam, a drive member forming means operable to rotate said support to turn the mounted object about an axis of rotation in and extending transversely of said beam and means embodying a translation device operable to shift the support in a direction to move the supported object in the beam in the direction of said axis, and means for measuring the response of said detector element to variations in the intensity of impinging X-rays.

References Cited in the file of this patent

UNITED STATES PATENTS

| | | |
|---|---|---|
| 2,145,866 | Failla | Feb. 7, 1939 |
| 2,222,450 | Trost | Nov. 19, 1940 |
| 2,477,307 | Mackta | July 26, 1949 |
| 2,532,644 | Robinson | Dec. 5, 1950 |
| 2,547,173 | Rittner | Apr. 3, 1951 |
| 2,687,477 | Pfaff | Aug. 28, 1954 |
| 2,688,702 | Fua | Sept. 7, 1954 |

OTHER REFERENCES

"On the Conductivity Produced in CdS Crystals by Irradiation with Gamma Rays," Frerich, Dec. 15, 1949, vol. 76, No. 12, pp. 1869–1875.

The Photo-Conductivity of "Incomplete Phosphors," Frerich's Physical Review, vol. 72, No. 7, Oct. 1, 1947, pp. 594–601.